United States Patent [19]
Hofler

[11] 3,763,598
[45] Oct. 9, 1973

[54] METHOD OF MAKING OR TESTING INVOLUTE HELICAL GEARS AND MACHINE THEREFOR

[76] Inventor: Willy Hofler, Fridtjof-Nansen-Strasse 35, 75 Karlsruhe, Germany

[22] Filed: Aug. 27, 1971

[21] Appl. No.: 175,605

Related U.S. Application Data

[63] Continuation-in-part of Ser. No. 82,952, Oct. 22, 1970, abandoned.

[30] Foreign Application Priority Data
Dec. 15, 1969  Germany.................. P 19 62 723.7

[52] U.S. Cl. ................................. 51/52 R, 51/287
[51] Int. Cl. ........................ B24b 19/00, B24b 1/00
[58] Field of Search............... 51/44, 45, 287, 52 R, 51/52 HB, 105 HB

[56] References Cited
UNITED STATES PATENTS

| | | | |
|---|---|---|---|
| 2,316,490 | 4/1943 | Semar............................... | 51/287 X |
| 2,897,634 | 8/1959 | Wildhaber ........................ | 51/287 X |
| 2,910,808 | 11/1959 | Wildhaber ........................ | 51/287 X |

FOREIGN PATENTS OR APPLICATIONS

| | | | |
|---|---|---|---|
| 1,169,261 | 11/1969 | Great Britain........................ | 51/287 |

*Primary Examiner*—Donald G. Kelly
*Attorney*—Jennings Bailey, Jr.

[57] ABSTRACT

The method of making or testing an involute helical gear comprises the steps of generating a back and forward motion of the tooth-forming tool or of a tracer tool relative to the gear and along the lines of contact on the tooth flank while the gear moves in rolling contact relative to the tool or tracer, and of imparting an additional feed motion to either the tool or the gear in a direction parallel to the direction of the back and forward motion from the moment when the lines of contact of the tool have become substantially equal in length to the length of the executed strokes. The lines of contact are the lines along which two meshing gears are in driving engagement with one another which lines extend transversely across each tooth flank, and the utmost length of the back and forward tool strokes is made equal to the longest lines of contact on the tooth flank plus some idle travel near the upper and lower points of reversal of motion.

9 Claims, 12 Drawing Figures

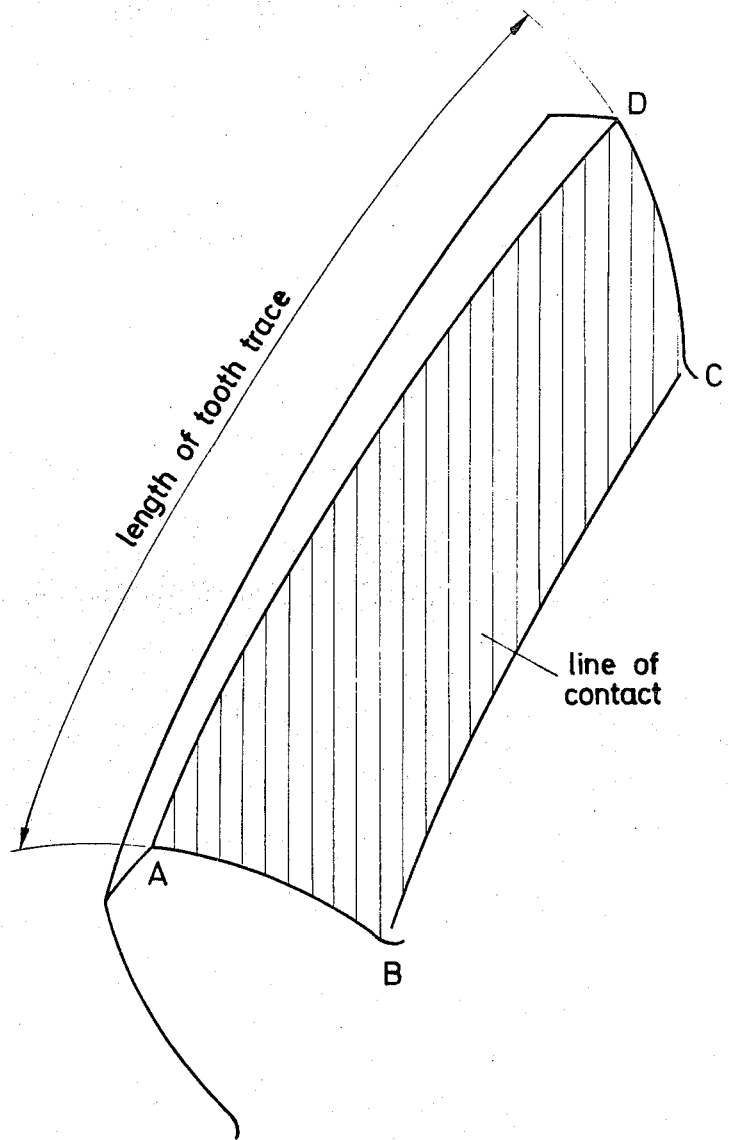

Patented Oct. 9, 1973 3,763,598

INVENTOR
WILLI HÖFLER
BY
James Bailey, J

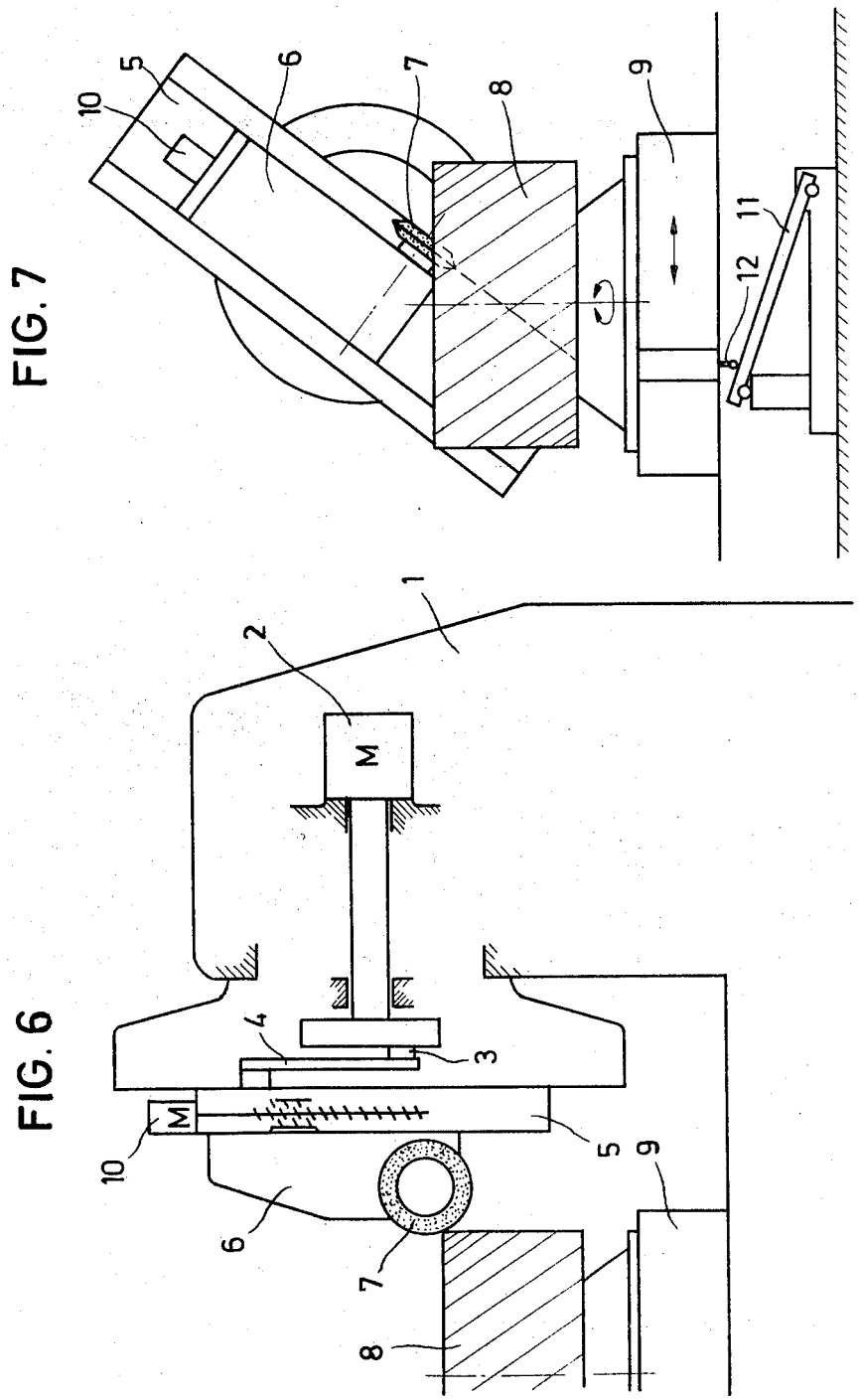

INVENTOR
WILLY HÖFLER
BY Jennings Bailey
ATTORNEY

Patented Oct. 9, 1973

INVENTOR
WILLI KÖFLER
BY
James Bailey J

METHOD OF MAKING OR TESTING INVOLUTE HELICAL GEARS AND MACHINE THEREFOR

RELATED APPLICATION

The application is a continuation in part of application Ser. No. 82,952 filed Oct. 22, 1970, now abandoned.

BACKGROUND OF THE INVENTION

1. Field of the Invention

The invention relates to a method of and apparatus for making or testing helical gears.

2. The Prior Art

It is already known in the art to make or test involute helical gears by following with a tool or tracer the lines of contact on the tooth face in a back and forward motion. As lines of contact, here and in the following, those lines are referred to along which two meshing gears are in touch with one another. Those lines of contact are straight lines on the tooth flanks of both spur gears and helical gears.

In the prior art methods and machines the relative back and forward movement between the tool and the gear is always performed over the total length of the tooth flank plus a certain idle travel at the upper and lower points of motion reverse, regardless of whether the manufactured gear is a spur gear or a helical gear. Since, however, with an increasing tooth angle the length of the tooth flank also increases, the stroke of the back and forward motion must also become longer and longer, thus greatly increasing the time needed for manufacture or testing.

Such a machine is shown for example in German patent 721,899 wherein a lever produces differential movements between a table which mounts rotatably a workpiece carrier and a slide which is connected to the carrier by straps so as to produce the turning movement of the workpiece required for the production of the helical groove.

It is therefore an object of my invention to reduce the production time of a helical gear considerably. And it is a further object to achieve this time reduction without causing additional costs with regard to tools and so on, so that the time saved will fully reflect favorably on the production costs.

SUMMARY OF THE INVENTION

The invention is based on the fact that with helical gears the lines of contact extend transversely across the tooth flank and are always considerably shorter than the total length of the tooth flank. Consequently a motion of the cutting tool or tracer tool through the tool length of the tooth flank along the lines of contact includes only a small section where the tool is actually in contact with the tooth flank while the distance through which the cutter or tracer moves idle is relatively long and useless.

With these conditions in mind the above stated objects of the invention are attained by a method of making helical gears wherein the stroke of the back and forward motion of the tool (the term tool including either a grinding tool or a testing tool) relative to the gear along a line of contact is made only as long as the longest lines of contact on the tooth face plus a certain idle travel at both points of reversal of motion and wherein, further, a feed motion in a direction parallel to the direction of the back and forward motion is imparted either to the tool or to the gear from the moment when the tool begins to work along the longest lines of contact. The additional feed motion has the effect of shifting the range of the relatively short tool strokes through the total length of the tooth flank so that, as a result, the complete tooth flank becomes gradually covered with tool strokes.

The prior art back and forward motion of the tool through the total length of the tool flank is thus, according to the invention, subdivided into considerably shorter tool strokes — which are executed only in a range where a contact between the tool and the tooth flank actually exists — on the one hand, and into a feed motion which serves to shift the area covered by the tool strokes gradually in the direction of the lines of contact so that all of the tooth flank is gradually shaped or contacted.

By the invention there is, thus, provided a method for making helical gears which makes use of considerably shorter tool strokes than the prior art methods, since these tool strokes do not extend through the full length of the gear flank plus idle motion any more, but only, at the utmost, through the length of the longest lines of contact plus idle motion. With the same tool velocity as in the prior art methods these shorter tool strokes allow an increase in the number of tool strokes. An increase in tool strokes, however, allows a higher rolling speed of the gear to be machined so that the time needed for making or testing a helical gear is accordingly reduced. If, however, on the other hand the rolling speed is kept constant the lines machined or engaged on the tooth flank by the tool will lie closer together since a greater number of cuts or strokes is executed during a given angle of gear rotation. Consequently a better finish of the tooth flank will be achieved.

According to another aspect of the invention, the length of one tool stroke may be varied in addition to the feed motion which shifts the range of strokes. This will result in a variation of the length of the strokes in dependence on the angle of gear rotation. The length of the strokes may thus be gradually adjusted to the shorter lines of contact at both ends of the tooth flank so that a maximum of production time is saved.

In a machine for performing the above described method, it has proven advantageous to control the tool slide either by means of a hydraulically actuated piston which moves in a stationary cylinder or by a spindle connected to an electric motor which transmits the necessary motion to the slide. This control motion may include the feed motion for shifting the area of strokes as well as the motion which changes the length of the strokes. One of these motions may, however, also be performed by the gear itself. This control of the motions may be performed by means known per se, for example by programmed control mechanisms. The number of strokes in a given time, that is, the stroke frequency, is then advantageously coupled to the variations in the stroke length.

A rather uncomplicated machine for performing the method may according to the invention comprise a tool slide which is subdivided into a "stroke slide" for performing the strokes across the tooth flank and into a "feed slide" moveably mounted on the stroke slide. The feed slide actually carries the tool cutter (or tracer) and is displaced on the stroke slide so as to shift the area covered by strokes gradually across all of the tooth face. The control of the feed motion may, for example, be accomplished by means of a fixed cam and a cam follower which is in driving connection with the feed slide. As a particularly uncomplicated cam, a sine bar can be used which is tilted relative to the horizontal direction according to the diameter of the gear to be manufactured.

BRIEF DESCRIPTION OF THE DRAWINGS

The invention will be more fully comprehended from the following description when taken in conjunction with the appending drawings, wherein:

FIG. 2 shows on an enlarged scale the lines of contact on one particular tooth flank, FIG. 6 is a schematic view of a machine comprising a device for performing the method according to the invention in a first embodiment, FIG. 7 is a front view of the machine shown in FIG. 6.

DESCRIPTION OF THE PREFERRED EMBODIMENTS

Figure 1:
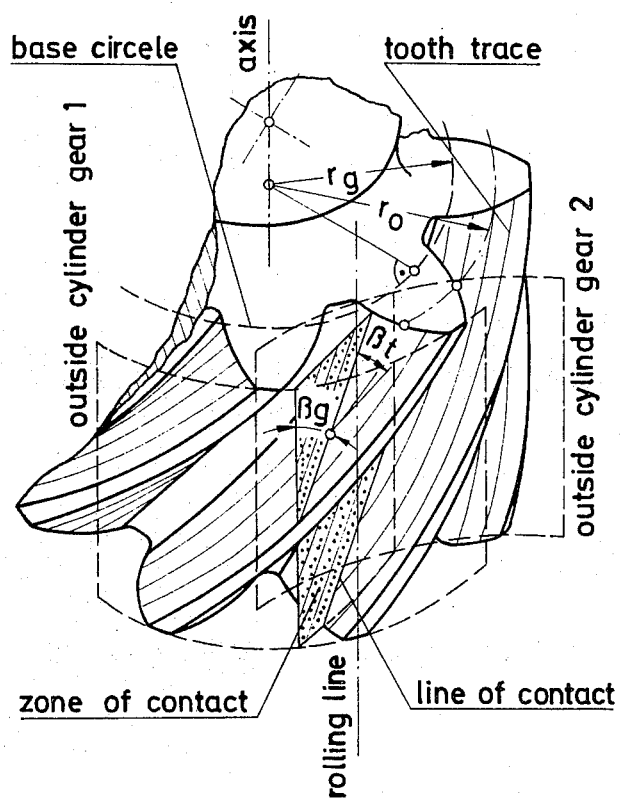
FIG. 1 illustrates the geometrical conditions of an involute helical gear.

Referring now to the drawings, from FIG. 1 the helically wound tooth traces on the tooth flanks are readily discernible which tooth traces extend parallel to the crest line of the teeth. Likewise the lines of contact are shown which extend in a straight line transversely across the tooth flanks. With helical gears the lines of contact are always shorter than the tooth traces.

The direction in which the lines of contact extend is further clearly shown in FIG. 2. Therefrom it will also be readily understood that the length of the lines of contact is zero at both ends of the tooth flank, while from this length increases gradually in the direction towards th intermediate area of the tooth flank, in which area it becomes a maximum. This actual maximum length depends on the pitch, on the gear diameter, and on the tooth angle.

Figure 5:
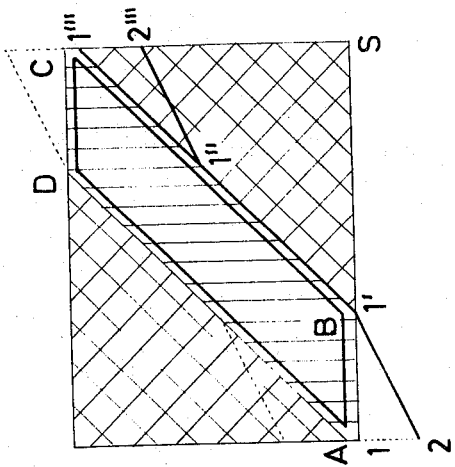
FIGS. 4 and 5 are diagrams of the same nature as shown in FIG. 3 but illustrating the stroke length required in the method according to the invention.
Figure 4:
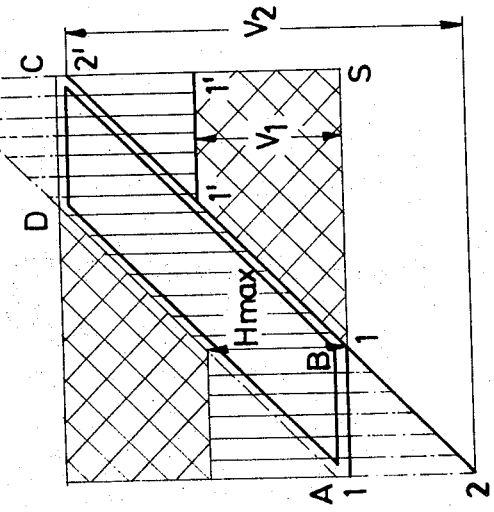
Figure 3:
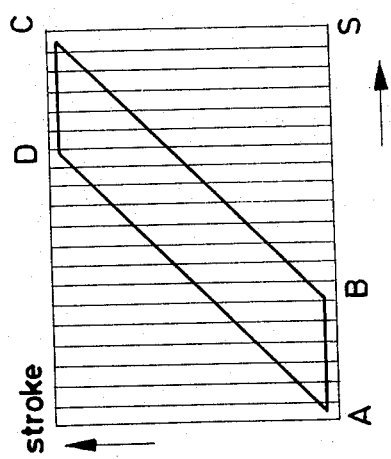
FIG. 3 is a diagram illustrating the length of the tool stroke in dependence on the angle of gear rotation or rolling distance $s$.

In FIGS. 3 through 5 the quadrangular area ABCD represents the unrolled tooth flank of FIG. 2, while the vertically extending lines indicate the direction of the strokes executed by the tool (or tracer) along the lines of contact on the tooth flank. FIGS. 3 through 5 may, thus, be interpreted as diagrams showing the direction of the back and forward motion of the tool as a function of the followinge motion of the gear.

FIG. 3 illustrates the prior art method of making or testing helical gears. The length SC of the tool stroke is always equal to the length of the tooth flank plus some idle travel near the points of reversal of motion. From FIG. 3 it will become particularly clear that the areas covered by strokes out of contact with the tooth flank, that is, idle strokes, is relatively large, while the actual working strokes (Those within the parallelogram ABCD) are relatively short.

FIG. 4 shows schematically one particular variation of the method according to the invention. This variation employs a back and forward motion, that is, a tool stroke, of constant length which, however, is not equal in length to the length of the tooth flank but only to the maximum length of the lines of contact, plus a certain idle travel, of course. For covering gradually all of the tooth flank with these relatively short strokes, the area wherein the strokes are executed must be shifted by a feed motion. To this end the following additional movements are to be executed:

The base of the back and forward motion, that is, the line of its lower points of reversal of motion, will extend along line 1—1 when no additional feed motion is performed. The production of a plurality of parallel lines of contact on the tooth flank is due only to the normal rolling motion of the gear relative to the tool. Along the line 1—1', however, a feed motion of the tool is required by means of which the area or range of strokes is shifted along line $V_1$ in an upward direction. Following this new base 1'–1' the tooth flank may be machined to the end.

When this feed motion $V_1$ is to be replaced by a continuous feed motion $V_2$, extending through all of the rolling distance of the gear, the base line of the back and forward motion is established at point 2 from where the feed motion starts immediately and continues until, at the end of the machining of the tooth flank, point 2' is reached. The continuous feed motion has some important advantages as far as the motion control is concerned, however, an extended length of the feed motion must be accepted as a consequence.

Of course, there are combinations of the two above described feed motions possible, for example, by first establishing the line 1—1 as the base line of the stroke motion and then by performing a feed motion beyond point 1' until point 2' is reached.

The time saved as a result of shorter strokes is about the same with all these possible combinations, provided that the length of the strokes is equal. The time saved is represented by the two cross-hatched areas shown in FIG. 4, while the quadrangular area in FIG. 3 indicates the total normal machining time.

The following examples will clearly demonstrate the extent to which working time is saved by the new method. The calculation is based on a helical gear 500 millimeters thick, having a pitch circle diameter of 600 millimeters and a tooth angle of 30°. The module is assumed to be 10 so that the number of teeth is 60. The length of the tooth flank of such a gear is about 577 millimeters. Consequently the length of the strokes in the prior art methods is about 610 millimeters, taking into account a certain idle travel at both ends of the strokes. With this stroke length about 60 strokes per minute may be executed and the rolling speed may be about 100 millimeters per minute. These conditions will result in a machining time of about 726 minutes.

If, however, the stroke length is, according to the invention, adjusted to the maximum length of the lines of contact plus idle travel, the stroke length will be only 160 millimeters, since the maximum length of the lines of contact in this example is only about 128 millimeters. This relatively short length of strokes allows an increase in the number of strokes to about 200 strokes per minute. Assuming, now, that per tooth flank the same number of strokes is performed as is done with the prior art method the rolling speed may be drastically increased to about 420 millimeters per minute. This results in an equally drastic reduction of the machining time to 114 minutes as compared to the 726 minutes required with the old method.

FIG. 5 illustrates graphically the conditions when the method according to the invention is employed with a varying length of stroke. The length is continuously changed so that it is always substantially equal to the length of the line of contact along which the tool works plus idle travel on both ends. As a result, the stroke motion is executed only through a distance wherein there is actually working contact between the tool cutter (or tracer) and the tooth flank. A maximum of machining time is thereby saved, but of course a special mechanism for controlling the stroke length is required.

Adjustment of the stroke length must be performed in accordance with the changing length of the lines of contact, beginning with a very short length which is particularly given by the idle travel alone. From there the strokes must gradually approach in length the maximum length of the lines of contact. After this maximum length has been reached it remains constant for a shorter or longer period of time depending on the dimensions of the gear, and thereafter the length of the strokes must be reduced again in accordance with the decreasing length of the lines of contact until, at the end, the strokes consist practically only of the idle travel again.

For controlling and adjusting the feed motion and the length of the stroke several movments may be performed. In order to facilitate understanding, first the movement along the lines 1—1" and 1'—1'" will be described. Starting again from the left-hand side of FIG. 5, the lower points of reversal of motion are arranged along line 1—1' with the upper points of reversal of motion gradually shifting in an upward direction until point 1' is reached where the maximum stroke length is reached. From there on this length remains constant, however, an additional feed motion is now introduced for shifting the whole stroke area along line 1'—1". After point 1" has been reached the stroke length must gradually be reduced so that at point 1'" the stroke consists only of the idle travel. If this decrease in length is achieved merely by lowering the upper points of reversal of motion, it will be necessary to continue the feed motion until point 1'" is reached. If, however, the decrease of the stroke length is obtained from shifting the lower points of reversal of motion, the feed motion may be stopped from point 1'" onwards.

Actually however, it is in practice rather difficult to reduce the stroke length only on one side. Consequently a reduction on both sides is preferred. This results in a feed motion extending roughly along the line 2—1'—1"—2'".

In FIGS. 6 and 7 a gear grinding machine for performing the method according to the invention is schematically shown. In a housing 1 a motor 2 is arranged which causes by means of a crank 3 and a connection rod 4 a stroke slide 5 to perform a back and forward motion. On stroke slide 5 a feed slide 6 is displaceably mounted which takes part in the back and forward motion, that is, the stroke motion. The feed slide 6 carries a grinding wheel 7 which rotates with a high number of r.p.m., driven by a motor not shown for sake of simplicity, or a tracer. The grinding wheel is of conventional shape, that is, it has straight flanks subtending an angle of 40° which is twice the usual pressure angle of 20°. A workpiece 8 to be formed into a helical gear is placed on a table 50 which performs the usual rolling motion and is mounted on longitudinally movable slide 9. As illustrated by FIG. 7, the stroke slide 5 is adjusted to the tooth angle of the gear to be machined by pivoting the machine element which carries the stroke slide 5 so that th grinding wheel 7 may move up and down between two flanks along the lines of contact of one flank.

When the method according to the invention is carried out, the feed motion necessary for displacing the range or area of strokes, which at the beginning of the operation is adjusted relative to the workpiece 8 by adjusting the excentricity of the crank 3, is imparted by a feed motor 10 which moves the feed slide 6 on the stroke slide 5 by means of a spindle in guide means which are without play. According to the invention the control of the feed motion may be performed by means of a sine bar 11 which is tilted relative to the horizontal direction. A cam follower 12, guided in the table 9, provides for a continual feed motion through all of the rolling distance $s$. For limiting the feed motion and subsequent automatic reversal of the motion for machining the opposite tooth flanks, the sine bar may be provided with known limit switches.

Figure 7A:
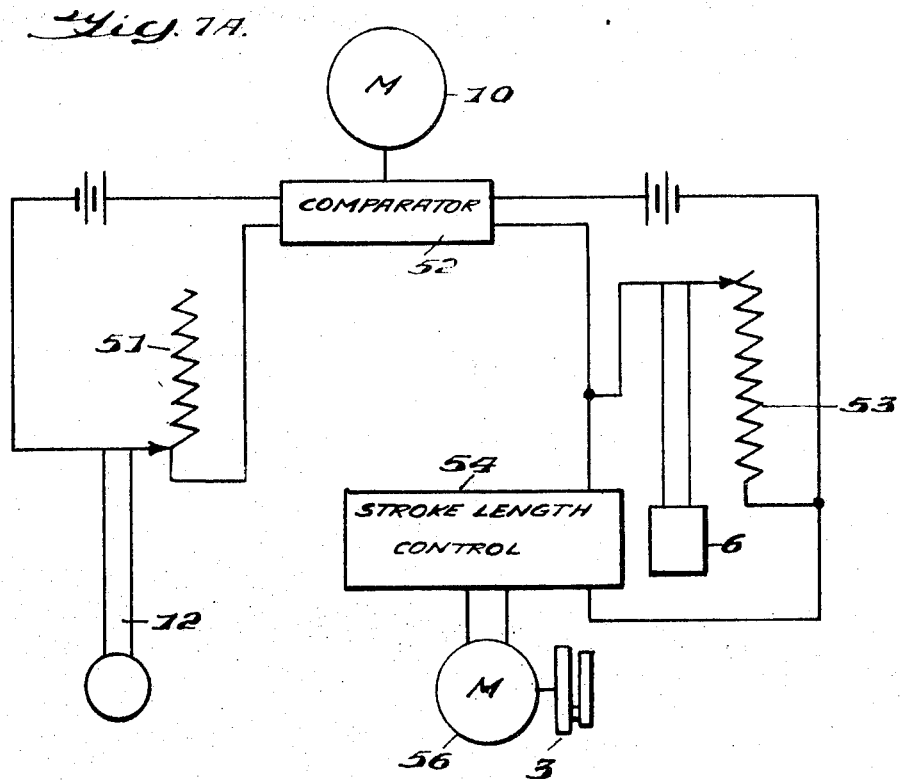
FIG. 7A is a circuit diagram showing the control of the tool carrying slide.

Referring to FIG. 7A, the cam follower 12 controls a rheostat 51 which feeds a comparator 52. This is also fed by rheostat 53 controlled by the position of the slide 6. The arrangement is such that upon any difference between the setting of the two rheostats the motor 10 will be driven in one direction or the other to shift the slide 6.

In normal operation in the arrangement shown in FIG. 7, the cam follower 12 will be gradually pushed inwardly or upwardly as the slide 9 moves throughout the rolling distance, so that the slide 6 will be moved constantly downward. This is represented by the parallelogram 1, 2, 1, 1', 2', 2", 1 in FIG. 4. It will be noted that in this modification the total variation in the position in the beginning of each working stroke must be equal to $V_2$.

Figure 7B:
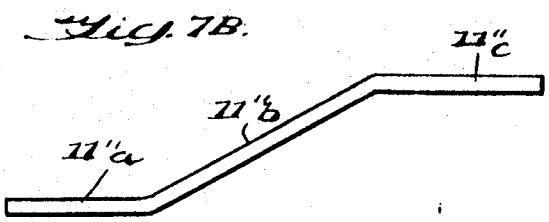
FIGS. 7B and 7C show variations of the sine bar.

In order to obtain a reduction in the necessary length of stroke adjustment, there is used a sine cam of the type shown in FIG. 7B, having beginning and ending horizontal sections $11'a$ and $11'c$ and intermediate sloping section $11'b$. This will cause the beginning of the stroke to follow the line 1, 1, 1', 2' in FIG. 4 so that total adjustment required is only the distance Sc.

With a machine as described above, the shifting of the stroke area along the line 2—2' in FIG. 4 can be accomplished in a very uncomplicated manner. For saving a maximum of machining time as described with reference to FIG. 5, the length of the strokes of the feed slide 6 must be varied in dependence on the rolling distance $s$. This can be achieved by means of a programmed electronic control system.

Figure 7C:
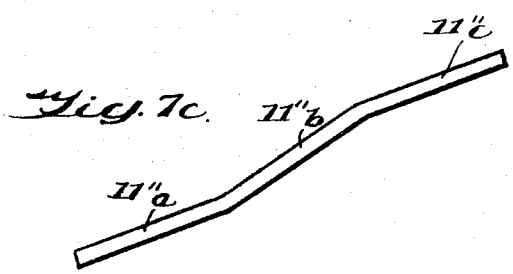

This is indicated diagrammatically in FIG. 7A, where using a sine cam of the type shown in FIG. 7C, having a first sloping section $11''a$, a second section $11''b$ of greater slope and a third section $11'c$ at the same slope as $11'a$. This will cause the beginning of the stroke to follow the line 2, 1, 1", 2'" in FIG. 5.

If however the area ABCD only in FIG. 5 is to be covered, there is provided a stroke length control mechansim 54 also controlled by rheostat 53 representing the position of the slide 6, which is coprogrammed as to control a motor 55 for adjusting the stroke of the crank 3 and thus the length of the operating stroke.

Figure 8:
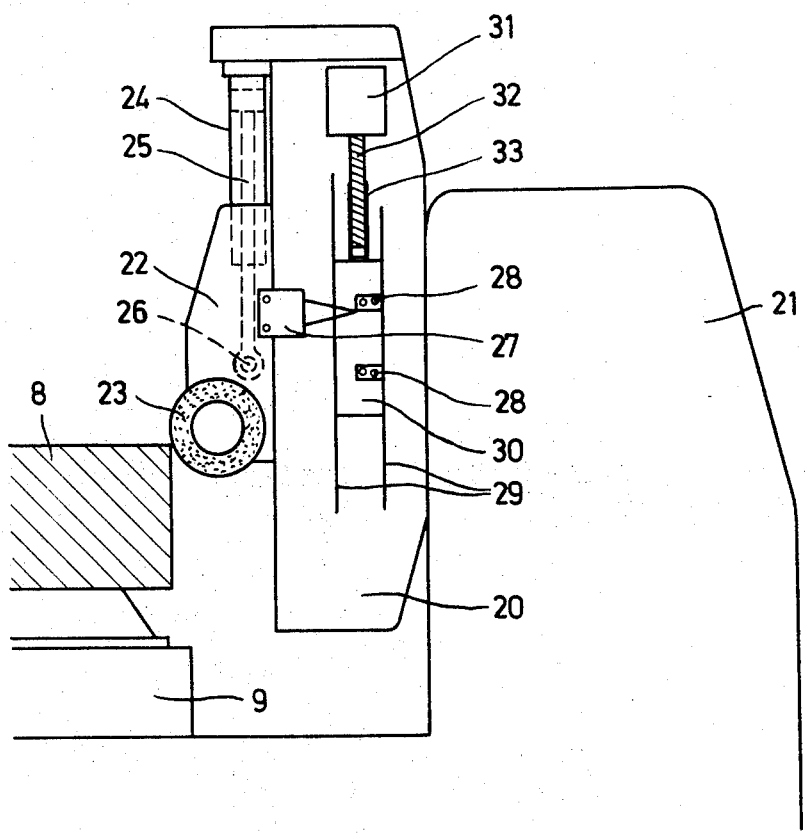
FIG. 8 is a schematic view of a machine comprising a device for performing the method according to the invention in a second embodiment.

The gear grinding machine illustrated in FIG. 8 comprises a machine element 20 which is pivotable on the machine stand 21 for adjusting the element to the desired tooth angle of the workpiece to be machined. A slide 22 is mounted in guide ways on the element 20 and carries a grinding wheel 23 which rotates with a high number of r.p.m. By means of a cylinder/piston-aggregate a back and forward motion is imparted to the slide 22. The cylinder 24 is rigidly connected to the machine element 20 and the piston rod 25 is linked at the point 26 to the slide 22.

The length of the back and forward motion of the slide 22, that is, the reversal of the direction of the slide motion, is controlled by a switch 27 in connection with two stop members 28 adjustably arranged on a slide 30 and supported in guide ways 29.

For imparting to the slide 22 the additional feed motion necessary for performing the method according to the invention, the gear grinding machine shown in FIG. 8 may also be provided with a sine bar 11 and with a cam follower 12 guided in the rolling machine table as already shown and described with reference to FIG. 7. The cam follower actuates a feed motor 31 which adjusts by means of a threaded spindle 32 and a correspondingly threaded screw socket 33 the slide 30 to which the screw socket is connected, thereby adjusting the position of the members 28 relative to the switch 27.

Figure 9:
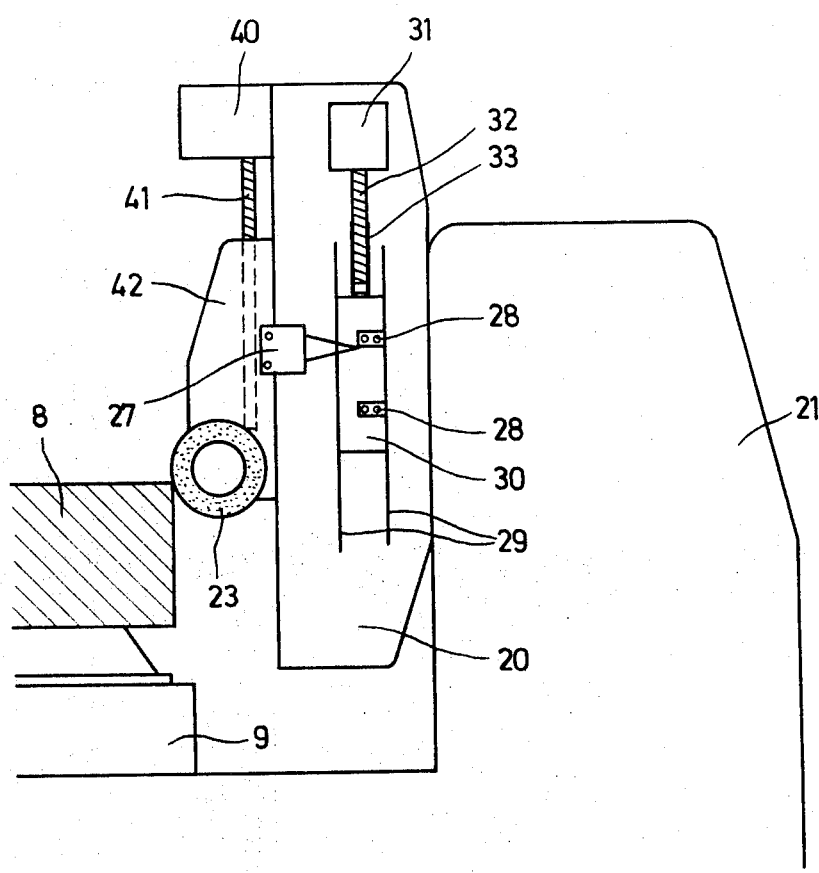
FIG. 9 is a schematic view of a third embodiment of a gear grinding machine.

The gear grinding machine illustrated in FIG. 9 is to a great extent similar to the one shown in FIG. 8 so that for the overall description of the machine reference is made to the description given in connection with FIG. 8. However, in the machine of FIG. 9 the cylinder/piston-aggregate of the machine of FIG. 8 is replaced by a spindle drive 40 of which the spindle rotates in a corresponding internal thread within the slide 42, thereby imparting a back and forward motion to the slide. The reversal of the direction of the spindle rotation, that is, the upper and lower points of the back and forward motion, is again controlled by the switch 27 in operative connection with the stop members 28.

I claim:

1. A method of making or testing an involute helical gear comprising the steps of
   a. generating back and forward strokes of a tool relative to the workpiece along the lines of contact on the tooth flank to be shaped while the workpiece moves in rolling contact relative to the tool, the length of the back and forward strokes being at the most equal to the maximum length of the lines of contact on the tooth flank plus idle travel near the upper and lower points of reversal of motion,
   b. producing an additional relative feed motion between the tool and the workpiece in a direction parallel to the direction of the tool strokes from the moment when the lines of contact become substantially equal in length to the length of the executed strokes, for gradually shifting the area covered by the strokes on the tooth flank, and
   c. varying the length of the tool strokes in dependence on the rolling distance of the workpiece.

2. A machine for making or testing an involute helical gear, comprising in combination
   a. a stand;
   b. a table connected to said stand for mounting the workpiece to be machined thereon, means for simultaneously rotating said table and moving it laterally so that said work piece performs a rolling motion;
   c. guide ways on said stand, and a stroke slide mounted in the guide ways;
   d. means for moving said stroke slide back and forward in said guide ways;
   e. a feed slide, means mounting said feed slide on said stroke slide for displacement thereon in a direction parallel to the direction of movement of said stroke slide;
   f. a tool mounted on said feed slide, said tool being adapted to engage along lines of contact on the tooth flank of said workpiece when said stroke slide performs said back and forward movement and said workpiece performs said rolling motion;
   g. means for controlling the feed motion of said feed slide in dependence on the lateral displacement of said machine table; and
   h. means to vary the length of the tool strokes in dependence on the rolling distance of the workpiece.

3. A machine as claimed in claim 2, wherein said means for controlling the feed motion of said feed slide comprises
   a. an electric motor mounted on said stroke slide;
   b. a stationary but rotatable spindle on said stroke slide driven by said motor and engaging said feed slide in an internally threaded socket;
   c. a cam mounted stationarily on said machine stand, said cam having portions of differing slope;
   d. a cam follower in sliding contact with said cam and guided in said machine table so as to be laterally movable therewith while, at the same time being movable by said cam in a direction different from the direction of the table movement; and
   e. electric means actuated by said cam follower and controlling the power supply of said electric motor in dependence on the displacement of said cam follower by said cam.

4. A machine for making or testing an involute helical gear comprising in combination
   a. a stand;
   b. a table connected to said stand for mounting the workpiece to be machined thereon, means for simultaneously rotating said work table and moving it laterally so that said workpiece performs a rolling motion;
   c. a stroke slide mounted in guide ways on said stand;
   d. means for moving said stroke slide back and forward in said guide ways;
   e. a tool mounted on said stroke slide, said tool being adapted to engage along lines of contact on the tooth flank of said workpiece when said stroke slide performs said back and forward strokes and said workpiece performs said rolling motion; and
   f. means for shifting the range and length of strokes of said stroke slide gradually in the direction of the strokes in dependence on the lateral displacement of said machine table.

5. A machine as claimed in claim 4, wherein said means for moving said stroke slide back and forward in said guide ways comprise a cylinder/piston-aggregate of which the cylinder is rigidly connected to said machine stand while the piston and the piston rod are linked to said stroke slide.

6. A machine as claimed in claim 4, wherein said means for moving said stroke slide back and forward in said guide ways comprise a spindle drive including a spindle mounted stationarily but rotatably on said machine stand and a screw socket engaged by said spindle, said screw socket being part of said stroke slide.

7. A machine as claimed in claim 4, wherein said means for shifting said range of said strokes comprise
   a. two stop members arranged adjustably on said stand;
   b. an electric switch mounted on said stroke slide, said switch being provided with a switch lever extending into the space between said stop members and being operated thereby;
   c. an electric motor for displacing said stop members in the direction of movement of said stroke slide, and
   d. means for actuating said electric motor in dependence on the lateral displacement of said machine table, thereby displacing said stop members relative to said machine stand and said electric switch.

8. A machine as claimed in claim 7, wherein said means for actuating said electric motor comprise
   a. a cam mounted stationarily on said machine stand;
   b. a cam follower in sliding contact with said cam and guided in said machine table so as to be laterally movable therewith while, at the same time, being movable by said cam in a direction different from the direction of the table movement;
   c. electric means actuated by said cam follower and controlling the power supply of said electric motor in dependence on the displacement of said cam follower by said cam.

9. A machine for making or testing an involute helical gear having a toothed flank comprising a workpiece carrying member and a tool carrying member, means to produce relative movement between the workpiece carrying member and the tool carrying member to generate back and forward strokes of the tool relative to the workpiece along the lines of contact on the workpiece while the workpiece moves in rolling contact relative to the tool, the relative motion between the tool and the workpiece carrying member being at most equal to the maximum length of the lines of contact on the tooth flank of a workpiece carried by the member plus idle travel near the points of reversal of motion, and means controlled by the position of the workpiece carrying member to impart an additional relative feed motion between the tool and the workpiece in a direction parallel to the direction of the tool strokes for gradually shifting the area covered by the strokes on the tooth flank and the length of such area in the direction of the tool strokes.

* * * * *